United States Patent
Umeda et al.

[11] Patent Number: 6,011,332
[45] Date of Patent: Jan. 4, 2000

[54] STATOR COOLING ARRANGEMENT OF ALTERNATOR FOR VEHICLE

[75] Inventors: Atsushi Umeda, Okazaki; Tsutomu Shiga, Nukata-gun; Shin Kusase, Obu, all of Japan

[73] Assignee: Denso Corporation, Kariya, Japan

[21] Appl. No.: 09/084,240

[22] Filed: May 26, 1998

[30] Foreign Application Priority Data

May 26, 1997 [WO] WIPO ............... PCT/JP97/01778
Feb. 26, 1998 [JP] Japan .................... 10-064684

[51] Int. Cl.$^7$ ......................................... H02K 9/00
[52] U.S. Cl. ....................... 310/58; 310/201; 310/260
[58] Field of Search ..................... 310/201, 58, 59, 310/260, 263

[56] References Cited

U.S. PATENT DOCUMENTS

| | | |
|---|---|---|
| 1,822,261 | 9/1931 | Apple . |
| 1,826,295 | 10/1931 | Apple .......................... 310/201 |
| 1,853,161 | 4/1932 | Apple .......................... 310/201 |
| 2,928,963 | 3/1960 | Bertsche . |
| 4,028,572 | 6/1977 | Baltisberger ................ 310/201 |
| 4,757,221 | 7/1988 | Kurihashi et al. ............. 310/62 |
| 4,870,307 | 9/1989 | Kitamura . |
| 5,093,591 | 3/1992 | Kitamura . |
| 5,097,167 | 3/1992 | Kanayama . |
| 5,122,705 | 6/1992 | Kusase et al. ............. 310/68 D |
| 5,449,962 | 9/1995 | Shichijyo et al. ........... 310/184 |
| 5,691,590 | 11/1997 | Kawai . |
| 5,714,824 | 2/1998 | Couture et al. ............. 310/208 |
| 5,742,498 | 4/1998 | Taniguchi .................... 310/180 |

FOREIGN PATENT DOCUMENTS

| | | |
|---|---|---|
| 3704780A1 | 11/1988 | Germany . |
| 48-442 | 1/1973 | Japan . |
| 50-47102 | 4/1975 | Japan . |
| 56-98358 | 8/1981 | Japan . |
| 59-159638 | 9/1984 | Japan . |
| 62-272836 | 11/1987 | Japan . |
| 63-274335 | 11/1988 | Japan . |
| 64-5340 | 1/1989 | Japan . |
| 3-159549 | 9/1991 | Japan . |
| 06121497 | 4/1994 | Japan . |
| 07046795 | 2/1995 | Japan . |
| 7-303351 | 11/1995 | Japan . |
| 8-205441 | 8/1996 | Japan . |
| 8-298756 | 11/1996 | Japan . |
| 1388512 | 3/1975 | United Kingdom . |
| 84-01478 | 4/1984 | WIPO . |
| 92-06527 | 4/1992 | WIPO . |

*Primary Examiner*—Thomas M. Dougherty
*Assistant Examiner*—Joseph Waks
*Attorney, Agent, or Firm*—Pillsbury Madison & Sutro LLP

[57] ABSTRACT

An alternator for a vehicle includes a stator, a rotor and a pair of cooling fans fixed on opposite sides of the rotor. The stator winding is composed of a conductor group disposed in the stator core and a pair of annular coil-end groups extending from the conductor group to be disposed on opposite sides of said stator core. Each of the coil-end groups has a plurality of coil ends which has a pair of inclined portion, and each one of the inclined portion disposed at the outermost circumference of the coil-end groups inclines to guide the cooling air spirally in an axial direction.

13 Claims, 7 Drawing Sheets

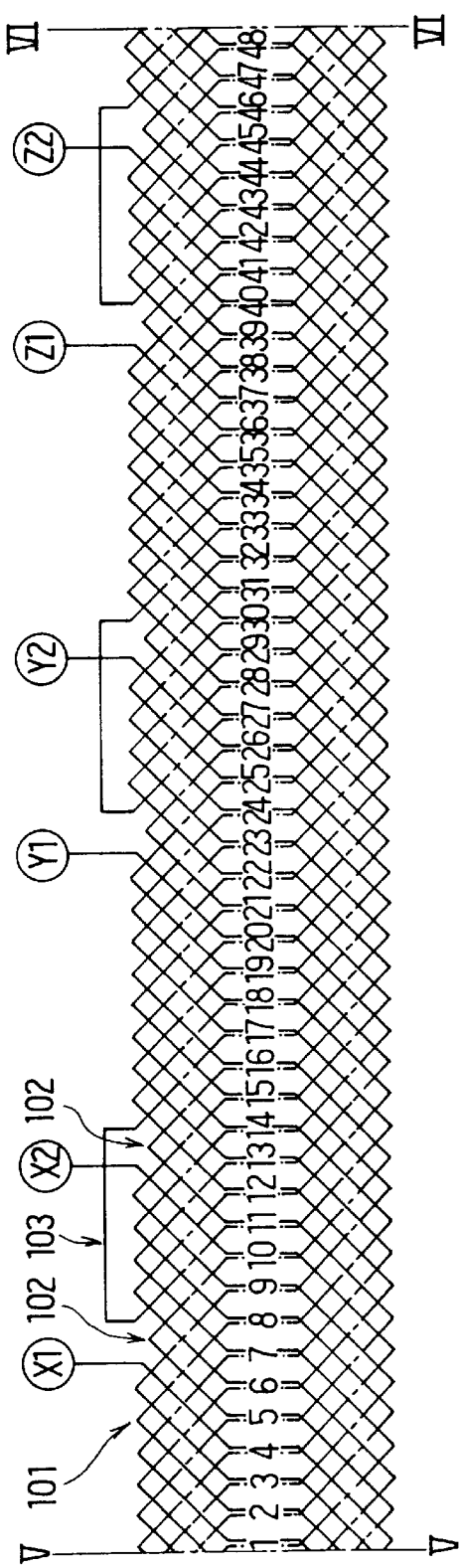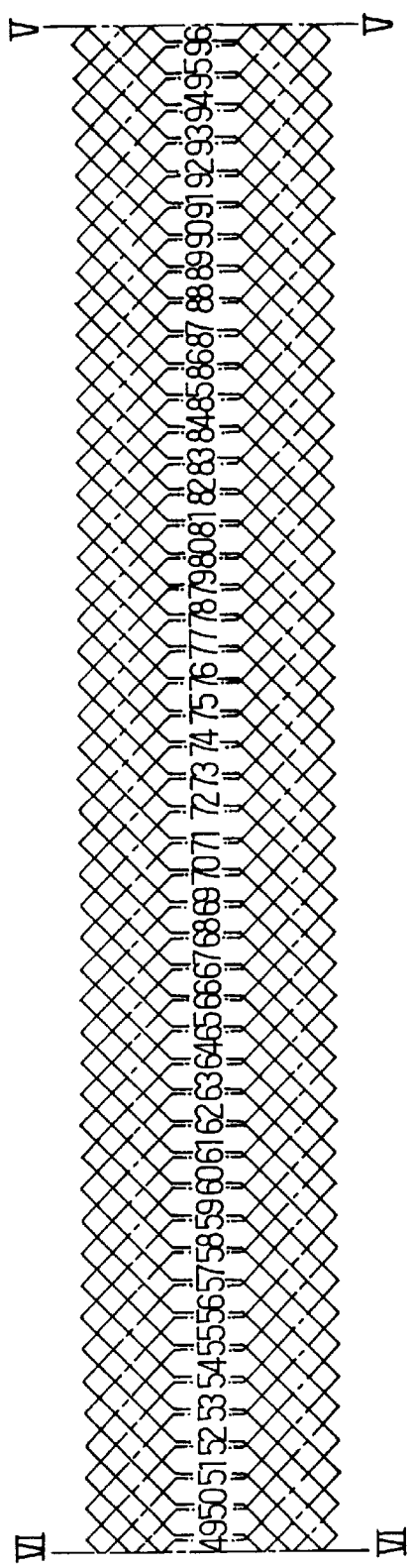

STATOR COOLING ARRANGEMENT OF ALTERNATOR FOR VEHICLE

BACKGROUND OF THE INVENTION

1. Field of the Invention

The present invention relates to an alternator driven by an internal combustion engine which is mounted in a vehicle such as a passenger car, a truck, or boat.

2. Description of the Related Art

It is necessary for an alternator for a vehicle to cool the stator winding, which is a heat source, effectively. JP-A-56-98358 discloses an alternator having a cooling fan inside a frame for sending cooling air directly to the coil ends (hereinafter referred to as the inner fan type) and flat coil ends with increased surfaces to be cooled.

On the other hand, WO92/06527 discloses a stator winding, which is composed of a plurality of conductor segments connected to one another. The above stator winding has gaps between the conductor segments and a more regular pattern of winding than a stator winding composed of a continuously wound wire. Because of the gaps between the coil ends, cooling air can be introduced around the conductor segments easily.

In the inner fan type alternator disclosed in JP-A-56-98358, cooling air is introduced only to the inner side of the coil ends and not to the outer side of the coil ends. In order to provide a reliable performance, an alternator must have expensive conductors coated with heat resistive insulation material. Flat coil ends increase resistance of the air flow, and cooling air is not sufficient to cool the alternator that generates high output power.

In the inner fan type alternator for a vehicle, hot air which has cooled the coil ends is discharged from discharge windows formed in the outer wall of the frame. The temperature of the discharged air becomes higher as the output power of the alternator increases. This affects various parts disposed outside the alternator and can not be ignored in view of the necessary vehicle reliability.

In particular, the non-metal belt on the drive pulley, which is disposed near some of the discharging windows, may be damaged by the hot air in a short period of time. If the belt deteriorates and breaks, the alternator and various engine accessories driven by the belt will stop, causing serious problems.

It is preferable to discharge the hot air from the side opposite to air intake windows in order to cool the coil ends effectively. The above described inner fan type alternator does not have this structure.

In the alternator disclosed in WO92/06527, cooling air is introduced to the conductors disposed at the outer side of the coil ends. Since the discharging direction of the hot air is not taken into consideration in the above prior art, the non-metal belt on the pulley may be damaged.

SUMMARY OF THE INVENTION

In view of the above problems, a main object of the present invention is to provide a new and improved alternator for a vehicle.

Another object of the present invention is to provide an alternator for a vehicle that prevents the heat problem of various parts, particularly, a belt which is disposed outside the alternator and exposed to the hot air.

A further object of the present invention is to reduce noise.

Another object of the present invention is to provide an alternator in which the outer side of the coil ends can be cooled effectively and the discharge direction of the cooling air can be controlled by a combination of the coil ends and the rotor.

According to a main feature of the invention, a plurality of conductors disposed at the outermost circumference of the coil-end group of the stator winding incline so as to guide cooling air spirally in one-way axial direction.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 6 is a winding diagram of a stator winding according to the first embodiment from first to 48-th slots;

FIG. 7 is a winding diagram of the stator according to the first embodiment from 49-th to 96-th slots;

DETAILED DESCRIPTION OF THE PREFERRED EMBODIMENTS

First Embodiment

Figure 1:
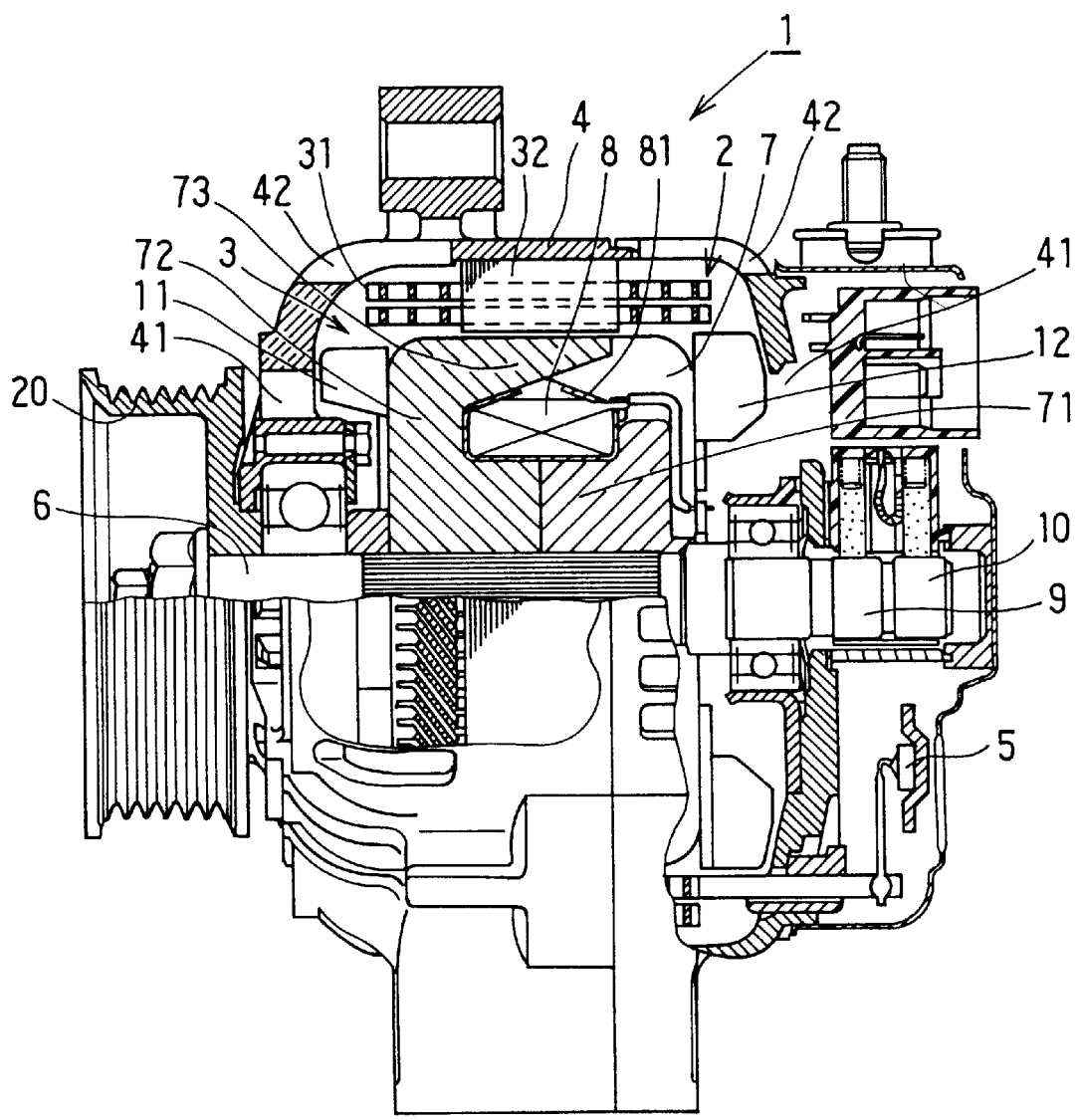
FIG. 1 is a cross-sectional view of a main portion of an alternator for a vehicle according to a first embodiment of the present invention.

An alternator for a vehicle according to a first embodiment of the present invention is described with reference to FIGS. 1–10.

Alternator 1 is composed of stator 2, rotor 3, frame 4 for supporting stator 2 and rotor 3 and rectifier 5 for converting ac power to dc power.

Rotor 3 rotates with shaft 6 and is composed of Lundell type pole core 7, field coil 8, slip rings 9, 10 and mixed-flow-type fan 11 and centrifugal fan 12. Shaft 6 is connected with pulley 20 and driven by a vehicle driving engine (not shown).

Pole core 7 is composed of a pair of pole core members. Each of the pole core members is composed of boss portion 71 fitted to shaft 6, disk portion 72 extending radially from boss portion 71 and a plurality of claw poles 73. Field coil 8 is fitted to the inner periphery of claw poles 73 via insulation sheet 81. Insulation sheet 81 is composed of a sheet impregnated with insulation resin, which is heated and bonded to field coil 8 to insulate field coil 8 from pole core 7.

Frame 4 has air discharge windows 42 at portions opposite coil ends 31 of stator 2 and air intake windows 41 at the ends thereof.

Stator 2 is composed of stator core 32, conductor segments 33 forming the stator winding and insulator 34 for insulating conductor segments 33 from stator core 32, and is supported by frame 4. Stator core 32 is composed of laminated steel sheets and has a plurality of slots 35 at the inner periphery thereof.

Figure 3:
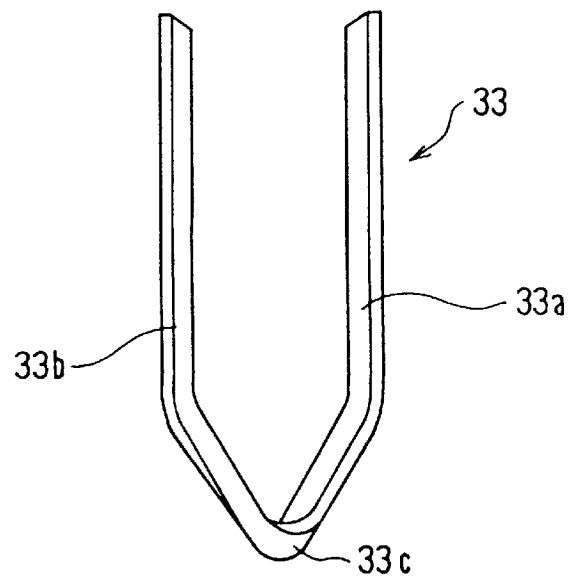
FIG. 3 is a perspective view of a conductor segment according to the first embodiment.

Two conductors having rectangular cross-section are inserted into each of slots 35, and the stator winding is composed of a plurality of conductor segments 33, illustrated in FIG. 3, connected to one another. The shape of the cross-section of the conductor is a rectangle having the longer sides in the radial direction than the sides in the circumferencial direction.

Figure 2:
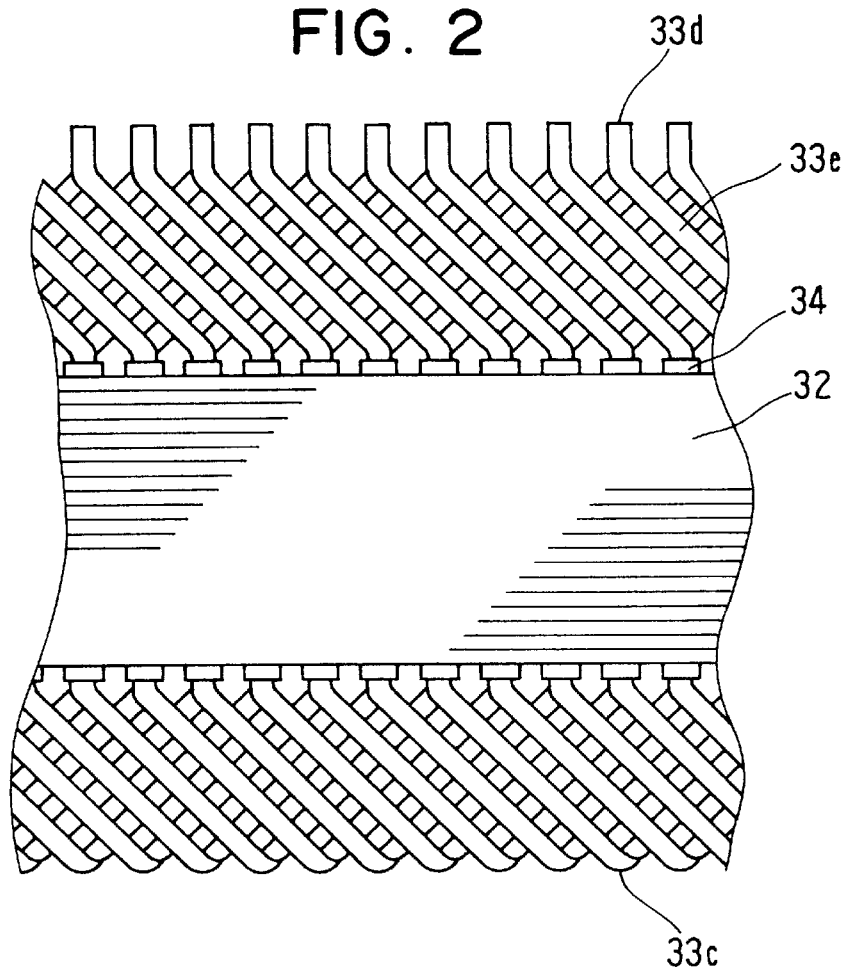
FIG. 2 is a outside view of a stator according to the first embodiment.

As shown in FIG. 2, U-turn portions 33c are disposed on one axial end of stator core 32, and joint portions 33d are disposed on the other end thereof. Inclined portions 33e (see also FIG. 5) of the coil ends 31 of conductor segments 33 in the outer layer 330b (see FIG. 4) are inclined oppositely to the inclined portions 33e thereof in the inner layer 330a (see FIG. 4). The inclination angle is the same in the same layer. Insulation coating is not always necessary for conductor segments 33.

Figure 4:
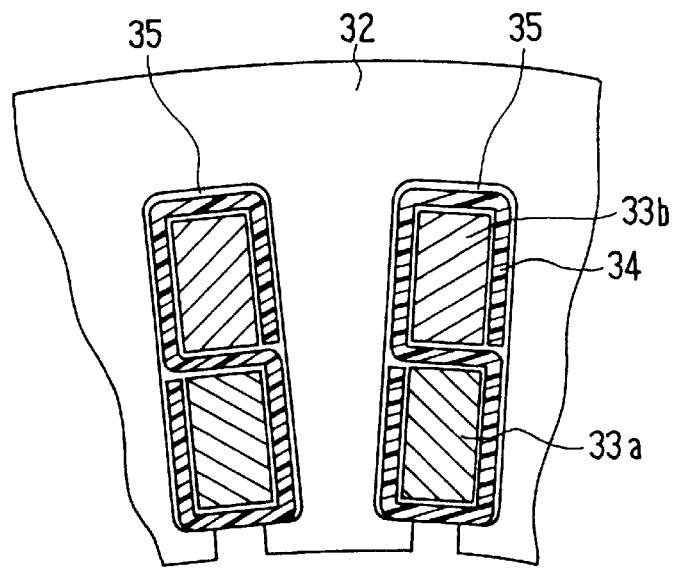
FIG. 4 is a fragmentary sectional view of the stator according to the first embodiment.
Figure 5:
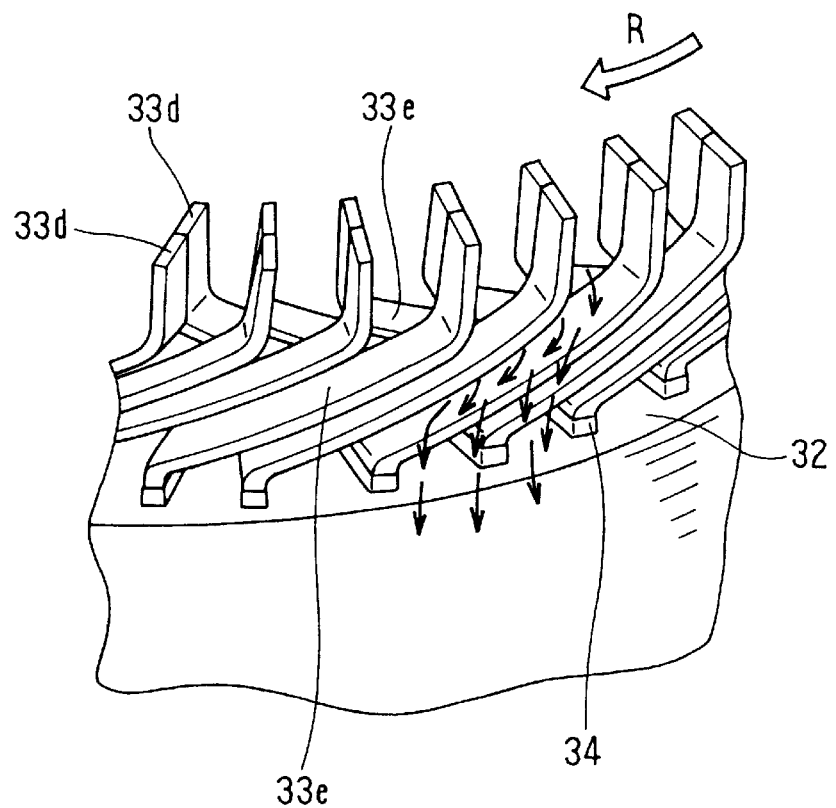
FIG. 5 is a perspective view of coil ends at opposite ends of the stator according to the first embodiment.

Manufacturing of the stator winding is as follows. Each of U-shaped conductor segments 33 is composed of conductor portion 33b in the outer layer 330b, conductor portion 33a in the inner layer 330a and U-turn portion 33c. U-shaped conductor segments are placed so that U-turn portions 33c are disposed on the same axial end of stator core 32. As shown in FIG. 4, conductor portions 33b in the outer layer 330b are inserted into the rear side of the slots, and conductor portions 33a in the inner layer 330a are inserted into the front side of the slot. Each of conductor segment 33 is formed from a copper plate, which is bent and shaped into a U-shape by a press machine or the like. Each of the conductor portions is press-fitted between parallel side walls of the outer layer 330b or inner layer 330c of corresponding slots via insulator 34. As shown in FIG. 5, joint portions 33d formed opposite coil end 31 formed by U-turn portion 33c are bent outward in the circumference from each other.

In this embodiment, the rotor has 16 poles, and stator core 32 has 96 slots. Conductor segments 33 are connected to form a three-phase winding.

Figure 8:
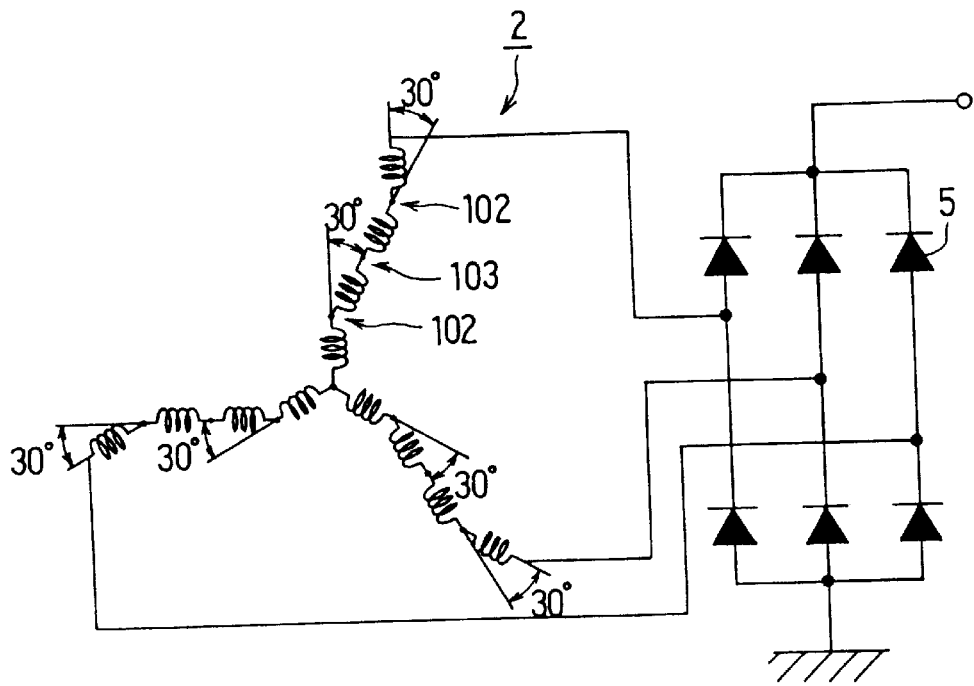
FIG. 8 is a circuit diagram of the alternator according to the first embodiment.

FIGS. 6, 7 and 8 illustrate an example of the winding. Solid lines represent conductors disposed in the outer layer 330b, and one-dot chain lines represent conductors disposed in the inner layer 330a.

Firstly, an X-phase winding is described hereafter. The slots numbered with 4, 10, 16 and the every successive sixth slot to the slot numbered with 94 form a first slot group. The slots numbered with 5, 11, and 17 and the every successive sixth slot to the slots numbered with 95 form a second slot group. A first winding starting from terminal X1 is formed in the first slot group and connected in series to a second winding by one of joint portions 102 as shown in FIG. 6. The second winding is turned over by conductor portion 103 disposed in the same layer so that the conductors of the same phase winding disposed in the same slot can be connected in series. The second winding is also connected in series with the first winding ending at terminal X2 by the other of joint portions 102.

Thus, the X-phase winding is composed of a pair of series-connected stator windings whose phase angle are 30° in electric-angle different from each other. Y-phase and Z-phase windings are also composed of stator windings in the same manner and disposed, respectively, in the stator core at 120° pitch in electric angle, thereby forming a three-phase star-winding shown in FIG. 8.

Figure 9:
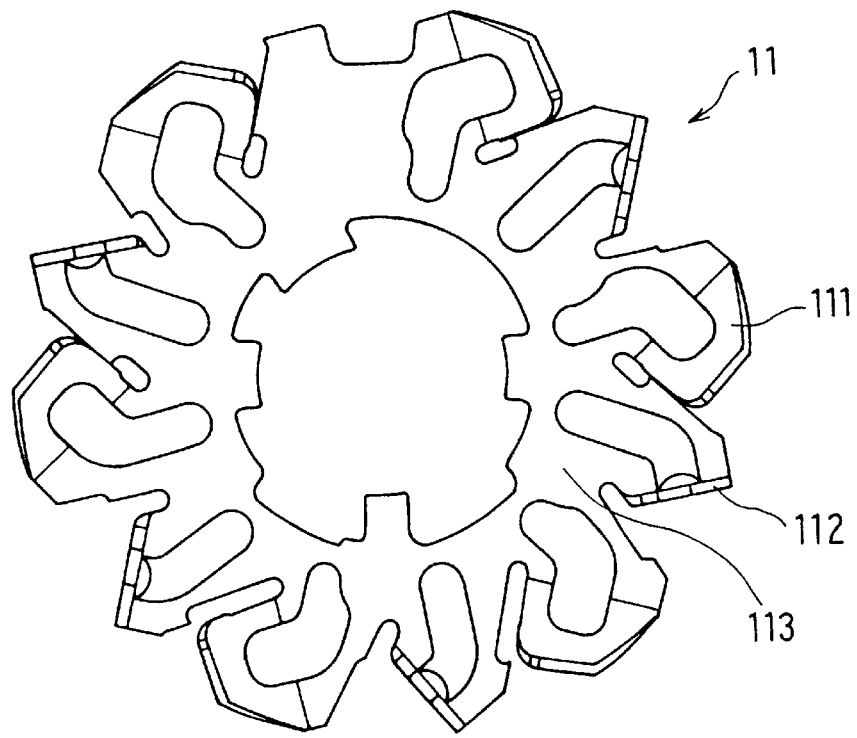
FIG. 9 is a front view of a fan of a rotor according to the first embodiment.
Figure 10:
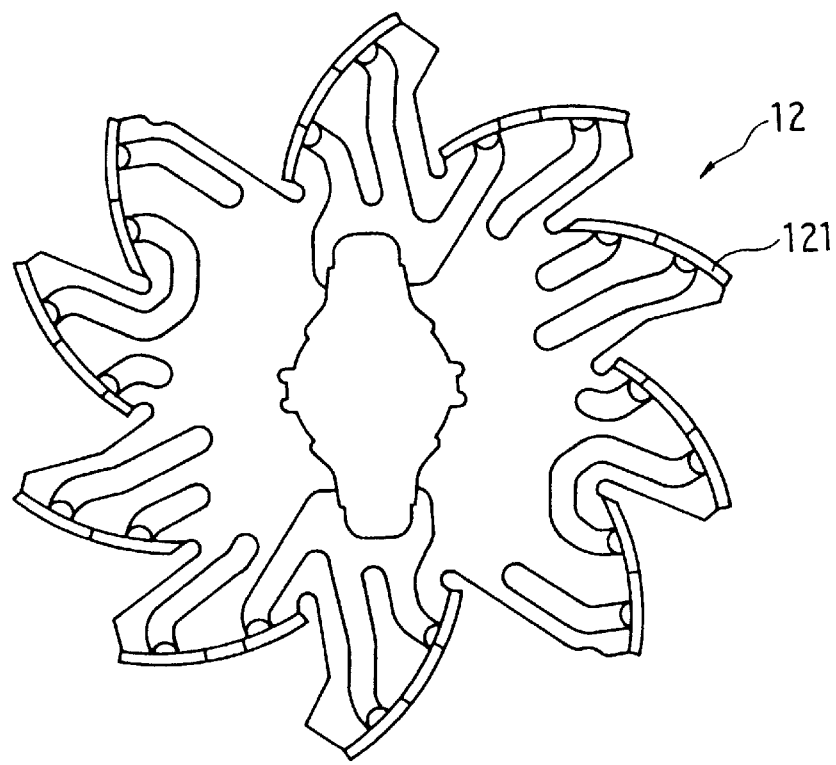
FIG. 10 is a front view of the other fan of the rotor according to the first embodiment.

Pulley-side cooling fan 11 has a plurality of blades 111 slanting to base plate 113 and a plurality of blades 112 perpendicular to base plate 113 as shown in FIG. 9. A plurality of blades 111 are slanted at an acute angle to base plate 112 against the rotating direction R. Base plate 113 is welded to the end surface of pole core 7 to be rotatable with rotor 3. Counter-pulley-side cooling fan 12 has a plurality of perpendicular blades 121 and no other blades.

FIG. 5 is a perspective view illustrating inclined conductors of coil ends 31 disposed on the inner circumference and the rotating direction R of rotor 3. Viewing from the side of pulley 20, rotor 3 rotates clockwise.

With the above-described structure, inclined portions 33e of coil ends 31 incline in the same direction in the same layer, so that a plurality of the stator windings can be disposed without interference with one another. Accordingly, regular continuous patterns are formed in the inner circumference of the coil ends 31 instead of substantially uneven portions. Because the conductors on the inner circumference of coil ends 31 incline in the same direction at opposite ends of stator core 32, cooling air flows along the same direction without obstruction. Therefore, it is possible to greatly increase the cooling effect of the stator winding, thereby increasing the output power of the alternator.

As shown in FIG. 5, an annularly-disposed conductors of the outer circumference of coil ends 31 incline along the cooling air flow in the forward rotating direction R of rotor 3. The cooling air, which is driven by fan 11 to flow along the inner side of coil ends in one-way axial direction, is also drawn by the rotation of rotor 3 to include a component of the rotating direction R. Thus, the cooling air flows in a spiral or whirl. In other words, the inclined portions of coil ends 31 guide the component of the cooling air to flow in the axial direction more effectively as indicated by arrows in FIG. 5.

In the outermost circumference of the coil ends 31, if the inclined portions of conductor segments 33 incline in the direction opposite to the intake-air direction and rotating direction R of rotor, the spiral flow of the cooling air that includes the component of the rotating direction R can be made opposite to the above. Thus, the discharging direction of the cooling air can be controlled by the inclined portions of the outermost circumference of the coil ends 31. Therefore, the hot discharge air can be directed away from various parts disposed outside the alternator such as the belt on pulley 20.

If the inclined portions of the outermost circumference of the coil ends 31 at the counter pulley side incline in the same direction as the inclined portions of the outermost circumference of the coil ends 31 at the pulley side, the cooling air can be discharged more effectively.

Mixed flow type cooling fan 11 on the side of pulley 20 has a plurality of slanted blades 111. When rotor 3 rotates in direction R in FIG. 9, blade 111 drives the cooling air in the axial direction as well as in the radial direction. Thus, the strong cooling air in the rotating direction can be supplied along the inner circumference of coil ends 31 without obstructing the air flow in the axial direction. As a result, the cooling air in the axial direction is increased to increase the cooling effect and the output power.

The cooling air is taken in from the side of the pulley 20 where ambient temperature is lower, and the temperature of the axial flow can be lowered so that field coil 8 can be cooled effectively.

The number of slots is six times as many as the number of the poles of rotor 3, and the conductors in the adjacent slots 35 are connected in series. Thus, the output power at a low speed can be increased with the two turn structure.

The following structure is also available instead of the above-described structure.

Two coil ends 31 are formed from joint portions 33d if S-shaped segments, each of which corresponds to a half portion of the U-shaped segment shown in FIG. 3, are used instead of U-shaped segment. The joint portions of the two segments are substituted for U-turn portion 33c.

Figure 11:
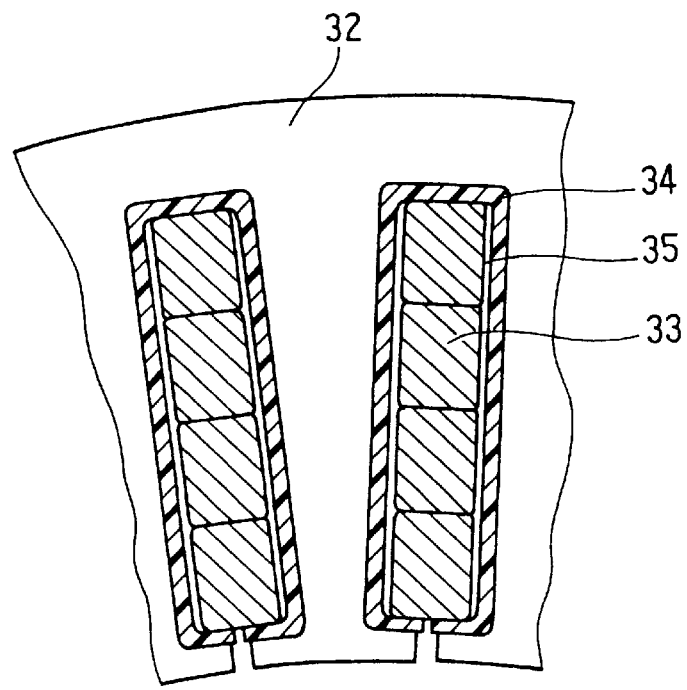
FIG. 11 is a fragmentary view of a stator according to another embodiment.
Figure 12:
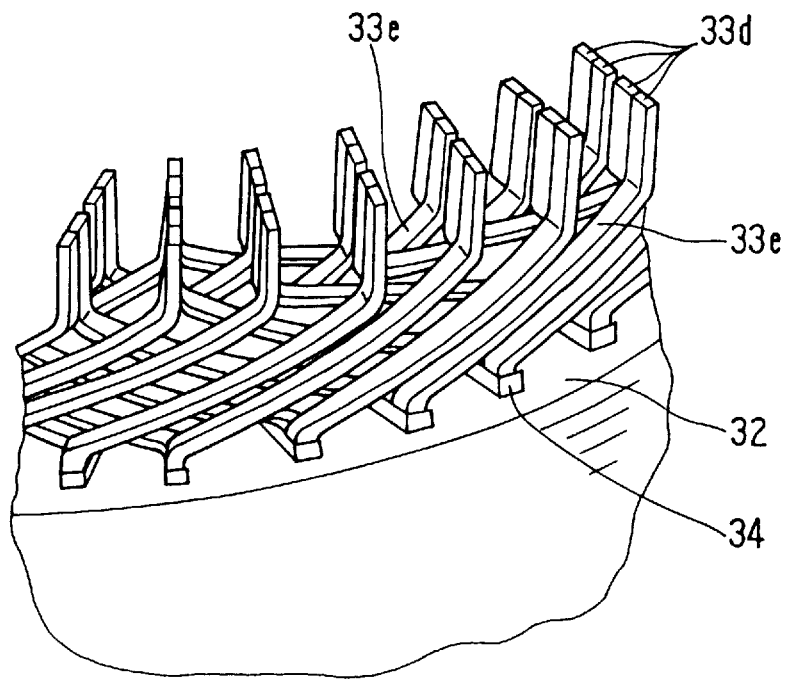
FIG. 12 is a fragmentary perspective view of the stator of another embodiment.

It is possible to insert two or more conductors in each of slots 35. In other words, four or more conductors can be inserted into each of slots 35 to increase the number of turns of the stator winding. As shown in FIG. 11, four conductors 33 are inserted into each of slots 35 to align in the radial direction. In FIG. 11, conductors 33 covered with insulation coating are inserted, and an insulation sheet is disposed between a bundle of conductors 33 and the wall of slot 35. Joint portions of this structure are shown in FIG. 12. Each of four conductors in each slot 35 extends oppositely from each other in the circumferential direction. The end portions of conductors in one slot are connected to the end portions of connectors in other slots. As shown in FIG. 12, the innermost conductors are connected to the conductors in the second layer, and the conductors in the third layer are connected to the conductors in the outermost conductors. Accordingly, a plurality of joint portions 33d are disposed annularly in two layers, inner layer and outer layer. In other words, a plurality of joint portions 33d are spaced apart from one another in both circumferential direction and radial direction. In this structure, the inclined direction of the conductors, rotating direction R of rotor 3 and axial component of the cooling air flow in the coil-end groups are arranged so that the conductors in the outermost circumference can be inclined in the forward direction with respect to the axial direction and the rotating direction R. The layer second therefrom can be also inclined in the forward direction with respect to the axial direction and the rotating direction R.

In order to provide gaps between the conductor segments 33 at the coil ends 31 thereof, it is preferable to align the conductors in slots 35 in the radial direction. The conductors can also be disposed in the slot circumferentially. For example, four conductors can be disposed side by side in two layers to form a square.

Bare conductors, conductors having square or elliptic cross-section can also be used. In order to let the cooling air to flow easily, it is preferable to select the shape of the cross-section of the conductors and disposition thereof in the inner circumference of the coil-end groups.

Because the side walls of the disk portions 72 of pole core 7 function as centrifugal fan blades, one or both cooling fans 11, 12 can be omitted if temperature rise is not so high.

Figure 13:
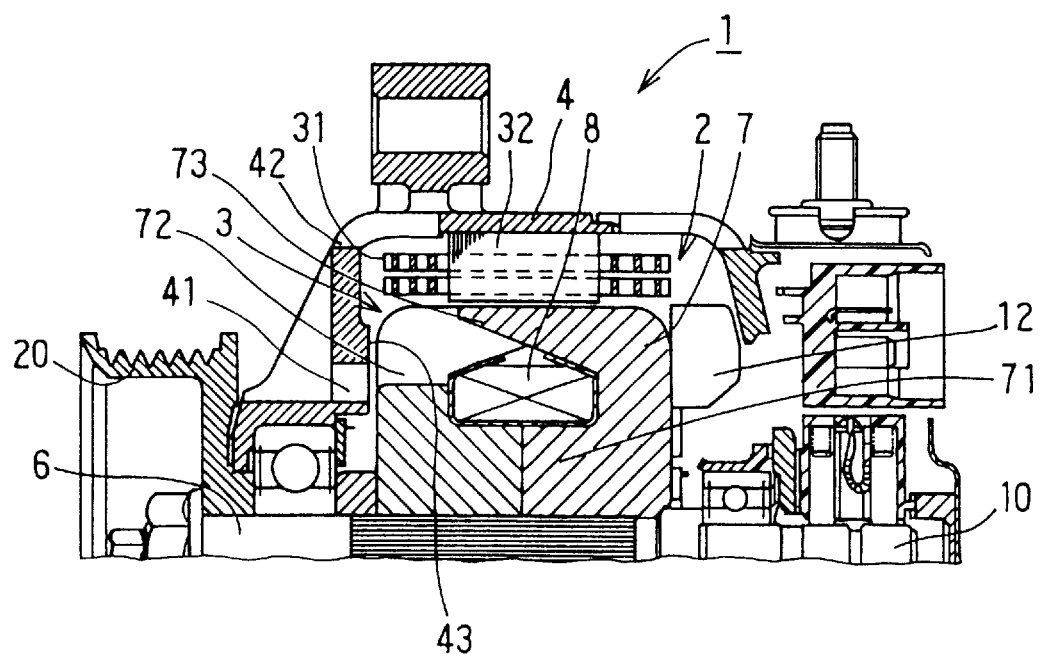
FIG. 13 is a cross-sectional view of a main portion of an alternator for a vehicle according to another embodiment.

As shown in FIG. 13, the pulley-side end of rotor without fan 11 can be disposed close to the pulley-side inner wall 43 of frame 4 around intake windows 41. Thus, inner wall 43 functions as a fan shroud to increase the fan effect of the disk portions 72 of the pole core, thereby increasing the axial air flow. Thus, the cooling effect of the field coil can be increased without increasing the number of parts and work time.

If the ambient temperature around the pulley 20 is comparatively high, cooling fan 12 disposed at the side opposite pulley 20 can be provided with fan blades for driving cooling air axially inside and also inclined portions of the conductor segments 33 of the inner circumference of coil ends 31 can be extended in the opposite direction. Thus, the structure can be applied so that the cooling air is taken from the side where the ambient temperature is comparatively low according to the circumstances. That is, the rotating direction R of rotor 3 and inclined direction of the coil ends are selected to supply the cooling air from the side where the ambient temperature is comparatively low. Thus, the temperature of the axial cooling air flow can be lowered to cool stator 2, magnetic field coil 8 and others effectively.

In the forgoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator for a vehicle including:

stator having a stator core, and a stator winding, a rotor disposed opposite said stator, and means for sending a cooling medium across said stator winding, wherein said stator winding comprises a conductor group disposed in said stator core and a pair of annular coil-end groups respectively extending from said conductor group so that each coil-end group of said pair of annular coil-end groups are disposed on opposite sides of said stator core, each of said conductor groups comprises a plurality of conductor portions and each of said coil-end groups comprises a plurality of coil ends disposed at one end of said stator core, each of said coil ends has a pair of inclined portions which are inclined with respect to a central longitudinal axis of said stator core, and each one of said inclined portions disposed at an outermost circumference of one of said coil-end groups inclines to form a cooling medium passageway to guide said cooling medium spirally in a one-way axial direction.

2. The alternator for a vehicle as claimed in claim 1, wherein each of said inclined portions disposed at an outermost circumference of said one of coil-end groups is inclined to discharge said cooling medium spirally toward a side opposite to an air intake window.

3. The alternator as claimed in claim 1, wherein said means for sending cooling medium has a plurality of fan blades disposed at an axial end of said rotor.

4. The alternator as claimed in claim 3, wherein
said blades are inclined to be acute to an axial direction of said rotor.

5. The alternator as claimed in claim 1, wherein
each one of said inclined portions disposed at the outermost circumference of another of said coil-end groups is inclined to guide said cooling medium spirally in said one-way axial direction.

6. The alternator as claimed in claim 1, wherein
a cross section of said stator winding is rectangular.

7. The alternator as claimed in claim 1, wherein
a rectangular cross section of said conductor portions disposed at an outermost circumference of said coil-end groups has larger radial sides than circumferential sides thereof.

8. An alternator for a vehicle including:
magnetic field rotor,
a stator having a stator core with a plurality of slots disposed opposite said rotor and a multi-phase stator winding,
a cooling fan driven with said field rotor,
a frame for supporting said rotor and said stator, and
a pulley disposed outside said frame, wherein
said magnetic field rotor comprises a plurality of claw poles and a field coil,
said multi-phase stator winding has a plurality of conductors,
said conductors are disposed to form one or more pairs as outer and inner layers in a depth of aid slots and to extend from opposite ends of said stator core outside said slots so that coil ends can be formed from two conductors respectively disposed in one of said layers different from each other in one of said slots different from each other in specific series connection patterns, whereby
said specific patterns are formed successively on the opposite ends of said stator core,
the cooling air is supplied by said cooling fan to flow across said conductors at said coil ends in said frame,
conductors of said plurality of conductors which are disposed at an outermost circumference of said coil ends are inclined in a circumferential direction to form cooling air passages for guiding said cooling air spirally to portions opposite said pulley outside said frame,
said rotor is disposed substantially within said stator core.

9. The alternator as claimed in claim 8, wherein
each of said conductors disposed at the outermost circumference of said coil ends has an inclined portion inclining from an axial end of said coil end to a base thereof, and an inclining direction of said inclined portion is the same as a rotating direction of said rotor.

10. The alternator as claimed in claim 8, wherein a fan having a plurality of fan blades is disposed at each axial end of said rotor.

11. The alternator as claimed in claim 10, wherein one of said fans disposed at a side of said pulley has one of said plurality of blades inclining to be acute to the axis of said rotor.

12. The alternator as claimed in claim 8, wherein
said one or more pairs comprising a plurality of pairs of said conductors which are disposed in said outer and inner layers in a line in a depth of each of said slots,
said conductors have a plurality of connected portions connected with other conductors,
said conductors are disposed annularly in a plurality of layers spaced apart from each other in coil-end groups in circumferential and radial directions.

13. The alternator as claimed in claim 8, wherein
said pair of conductors is disposed in said outer and inner layers,
said slots are disposed at 30° in electric angle,
the conductors in a first slot group composed of slots spaced apart one slot pitch with one another are connected in series to form a first series-connected group,
the conductors in a second slot group next to said first slot group are connected in series to form a second series-connected group,
a first phase winding is composed of said first and second series-connected groups connected in series to each other.

* * * * *